(12) United States Patent
Vook et al.

(10) Patent No.: US 7,196,829 B2
(45) Date of Patent: Mar. 27, 2007

(54) DIGITAL IMAGE SYSTEM AND METHOD FOR COMBINING SENSING AND IMAGE PROCESSING ON SENSOR WITH TWO-COLOR PHOTO-DETECTOR

(75) Inventors: Dietrich W. Vook, Menlo Park, CA (US); Izhak Baharav, San Jose, CA (US)

(73) Assignee: Micron Technology Inc., Boise, ID (US)

( * ) Notice: Subject to any disclaimer, the term of this patent is extended or adjusted under 35 U.S.C. 154(b) by 1186 days.

(21) Appl. No.: 10/043,464

(22) Filed: Jan. 10, 2002

(65) Prior Publication Data

US 2003/0128409 A1    Jul. 10, 2003

(51) Int. Cl.
*H04N 1/46* (2006.01)

(52) U.S. Cl. .............. 358/513; 358/514; 358/213.11; 358/482; 382/164

(58) Field of Classification Search ........ 358/513–514, 358/213.11, 482; 345/426, 593; 382/164; 257/440, 458, 431; 348/272–273
See application file for complete search history.

(56) References Cited

U.S. PATENT DOCUMENTS

| | | | |
|---|---|---|---|
| 5,965,875 A | 10/1999 | Merrill | 250/226 |
| 5,998,806 A | 12/1999 | Stiebig et al. | 257/55 |
| 6,016,011 A | 1/2000 | Cao et al. | 257/773 |
| 6,018,187 A | 1/2000 | Theil et al. | 257/458 |
| 6,111,300 A | 8/2000 | Cao et al. | 257/440 |
| 6,114,739 A | 9/2000 | Theil et al. | 257/458 |
| 6,215,164 B1 | 4/2001 | Cao et al. | 257/431 |
| 2003/0052981 A1* | 3/2003 | Kakarala et al. | 348/272 |

OTHER PUBLICATIONS

Richard F. Lyon; *Prism-Based Color Separation for Professional Digital Photograph*; IS&T's 2000 PICS Conference; pp. 50-54.
D. Knipp, H. Stiebig, J. Fölsch and H. Wagner, *Four terminal color detector for digital signal processing*; 1998 Elsevier Science B.V.; pp. 1321-1325.

(Continued)

*Primary Examiner*—Thomas D. Lee
*Assistant Examiner*—Heather D Gibbs
(74) *Attorney, Agent, or Firm*—RatnerPrestia (57) ABSTRACT

A digital image system is disclosed having a sensor with an elevated two-color photo-detector for sensing two different color values in combination with a single-color photo-detector for sensing a third color value. Minimal demosaicing is performed to obtain at least one luminance value at each photo-detector location. The sampled chrominance values and sampled and demosaiced luminance values are directly compressed without converting between color spaces and with minimal or no processing required. With a reduced amount of image processing prior to image compression, all of the pre-compression image processing may be performed on the image sensor itself instead of on a separate image processing system.

27 Claims, 5 Drawing Sheets

OTHER PUBLICATIONS

Matt Borg, Ray Mentzer and Kalwant Singh; *A High Intage Quality Fully Integrated CMOS Image Sensor*; IS&T; pp. 1-6.

K.M. Findlater, P.B. Denyer, R.K. Henderson, J.E.D. Hurwitz, J.M. Raynor and D. Renshaw; *Buried double junction pixel using green and magenta filters*; 1998-1999; pp. 60-63.

K.M. Findlater, D. Renshaw, J.E.D. Hurwitz, R. K. Henderson, T.E.R. Bailey, S.G. Smith, M.D. Purcell and J.M. Raynor; *A CMOS Image Sensor Employing a Double Junction Photodiode*; IEEE Workshop on Charge-Coupled Devices and Advanced Image Sensors; Jun. 7-9, 2001; pp. 60-63.

M.D. Purcell, D. Renshaw, K.M. Findlater, J.E.D. Hurwitz, S.G. Smith and T.E.R. Bailey; *Hexagonal Array Processing*; IEEE Workshop on Charge-Coupled Devices and Advanced Image Sensors; Jun. 7-9, 2001; pp. 83-86.

Patrick C. Herzog, Dietmar Knipp, Helmut Stiebig and Friedhelm König; *Characterization of novel three and six channel color moiré free sensors*; Conference on Color Imaging: Device-Independent Color, Color Hardcopy, and Graphic Arts IV; SPIE vol. 3648; Jan. 1999; pp. 48-59.

\* cited by examiner

DIGITAL IMAGE SYSTEM AND METHOD FOR COMBINING SENSING AND IMAGE PROCESSING ON SENSOR WITH TWO-COLOR PHOTO-DETECTOR

BACKGROUND OF THE INVENTION

1. Technical Field of the Invention

The present invention relates generally to digital color image sensors, and specifically to image processing of sensor values.

2. Description of Related Art

Electronic image sensors are predominately of two types: CCDs (Charge Coupled Devices) and CMOS-APS (Complimentary Metal Oxide Semiconductor-Active Photo-detector Sensors). Both types of sensors typically contain an array of photo-detectors (e.g., pixels), arranged in rows and columns or arranged in another pattern, that sample color within an image. Each photo-detector measures the intensity of light within one or more ranges of wavelengths, corresponding to one or more perceived colors.

In addition, both types of sensors may include a color filter array (CFA), such as the CFA described in U.S. Pat. No. 3,971,065 to Bayer (hereinafter referred to as Bayer), which is hereby incorporated by reference. With the Bayer CFA, each photo-detector sees only one wavelength range, corresponding to the color red, green or blue. To obtain the sensor values for all three primary colors at a single photo-detector location, it is necessary to interpolate the color sensor values from adjacent or surrounding photo-detectors. This process of interpolation is called demosaicing.

Unless the demosaiced image is immediately output, the demosaiced image must be stored in a storage medium for later retrieval. Due to the large amount of memory necessary for storing demosaiced images, many applications utilize image compression techniques that represent the demosaiced images with less data in order to save storage costs or reduce transmission time. Compression can be performed using a lossless compression technique or using a lossy technique, such as JPEG (Joint Photographic Experts Group). A discussion of the JPEG technique can be found in: W. Pennebaker and J. Mitchell, "JPEG: Still Image Data Compression Standard," New York: Van Nostrand Reinhold, 1993, which is hereby incorporated by reference.

To improve the image quality, many applications convert the photo-detector values to another color space prior to compressing the image. For example, an array of photo-detectors arranged in rows and columns and fitted with a Bayer CFA typically has the following repeat unit:

$$\begin{matrix} G & R \\ B & G' \end{matrix}$$

which is stepped and repeated throughout the array of photo-detectors. Thus, each repeat unit produces four photo-detector values: two green, one red and one blue. After demosaicing, the repeat unit has twelve photo-detector values: four green, four red and four blue. Since the human eye is more sensitive to changes in luminance, which is dominated by green, than chrominance, which is dominated by red and blue, the twelve demosaiced photo-detector values are typically converted into the YCbCr color space, followed by a 4:1:1 decimation. The result is four luminance values (Y) and two chrominance values (Cr, which corresponds to red chrominance, and Cb, which corresponds to blue chrominance) for each block of four photo-detectors. To convert the twelve demosaiced color values into the four luminance and two chrominance values, one of a number of well-known conversion matrices may be used.

One of the drawbacks of the above standard image processing techniques is that the substantial processing required to perform demosaicing and color space transformation increases the cost and complexity of conventional image processing systems. Another drawback of the above standard image processing techniques is that, due to area constraints on image sensors, the extensive image processing (demosaicing, color space transformation and image compression) is performed by an image processing system separate from the image sensor. Therefore, what is needed is a digital image sensor capable of combining both sensing and at least part of the image processing to reduce the cost and complexity of image processing.

SUMMARY OF THE INVENTION

The present invention provides a digital image system capable of combining both sensing and at least part of the image processing on digital image data. The system includes a digital image sensor having an elevated two-color photo-detector for sensing two different color values in combination with a single-color photo-detector for sensing a third color value. The system interpolates only the luminance values to obtain at least one luminance value at each photo-detector location. The sampled chrominance values and sampled and demosaiced luminance values are directly compressed without converting between color spaces.

Therefore, by eliminating chrominance demosaicing and color space transformation, the amount of image processing is reduced. In addition, with a reduced amount of image processing, some of the image processing may be performed on the image sensor itself instead of on a separate image processing system. Furthermore, the invention provides embodiments with other features and advantages in addition to or in lieu of those discussed above. Many of these features and advantages are apparent from the description below with reference to the following drawings.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the exemplary embodiments. However, it should be understood that these embodiments provide only a few examples of the many advantageous uses of the innovative teachings herein. In general, statements made in the specification do not necessarily delimit any of the various claimed inventions. Moreover, some statements may apply to some inventive features, but not to others.

Figure 1:
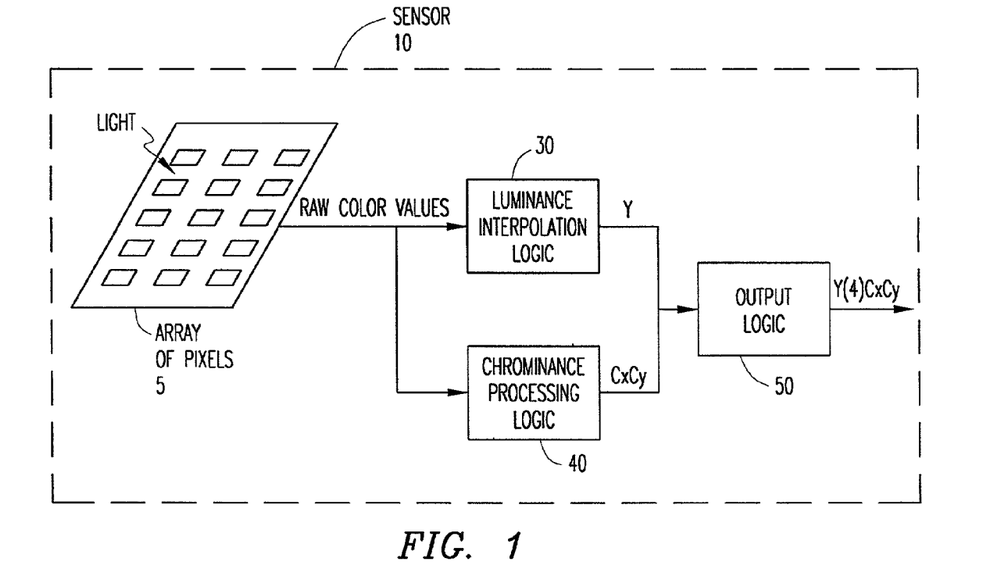
FIG. 1 is a block diagram of a sensor in accordance with embodiments of the present invention.

FIG. 1 illustrates a digital image sensor 10 having an array of photo-detectors 5 for detecting light from an image impinging on the surface of the sensor 10. Each photo-detector within the array of photo-detectors 5 detects one or more colors (ranges of wavelengths) and outputs raw color values, representing the intensity of light within each range of wavelengths that the photo-detector is capable of detecting. The raw color values include luminance values (e.g., green or yellow values) and chrominance values (e.g., red and blue values or magenta and cyan values). Once the raw color values are obtained, minimal image processing of the raw color values may be performed on the image sensor 10 itself instead of by a separate image processing system. The image processing performed by the image sensor 10 include luminance interpolation logic 30 and chrominance processing logic 40.

The luminance interpolation logic 30 receives the raw color values, and interpolates luminance values (e.g., green or yellow values) at each photo-detector location that did not detect a luminance value. A simple interpolation algorithm without complex multiplication tables performs the luminance interpolation. Examples of simple interpolation algorithms will be described in more detail below in connection with FIGS. 6, 8 and 10.

The chrominance processing logic 40 may or may not be required depending on the photo-detector repeat unit, the color filter array (CFA) used and the processing constraints of the sensor 10. For example, the chrominance processing logic 40 may use a chrominance algorithm to subtract out the luminance information in a raw chrominance value (e.g., a red, blue, magenta or cyan value) when a photo-detector is capable of detecting both luminance and chrominance values. Other examples of chrominance algorithms are described in more detail below in connection with FIGS. 6, 8 and 10.

Once the luminance values have been interpolated and the chrominance values have been processed, output logic 50 within the sensor 10 outputs groups of color values, with each group containing four luminance values (e.g., four green values or four yellow values) and two chrominance values (e.g., one red value and one blue value or one magenta value and one cyan value). The four luminance values are termed herein Y values and the two chrominance values are termed herein Cx and Cy values. It is these groups of color data (e.g., Y(4)CxCy) that may be compressed using any type of compression technique for storage and retrieval by a digital image system.

It should be understood that the YCxCy color plane described herein may not exactly correspond to the YCbCr color plane known in the art. The Y values in the YCbCr color plane are weighted combinations of the sampled luminance and chrominance values, whereas the Y values in the YCxCy color plane described herein may include only luminance values. Therefore, there may be some small error in the Y values of the YCxCy color plane as compared with the YCbCr color plane. However, since the human eye is more sensitive to luminance than to chrominance (e.g., brightness vs. color), the error in most cases is not noticeable.

Figure 2:
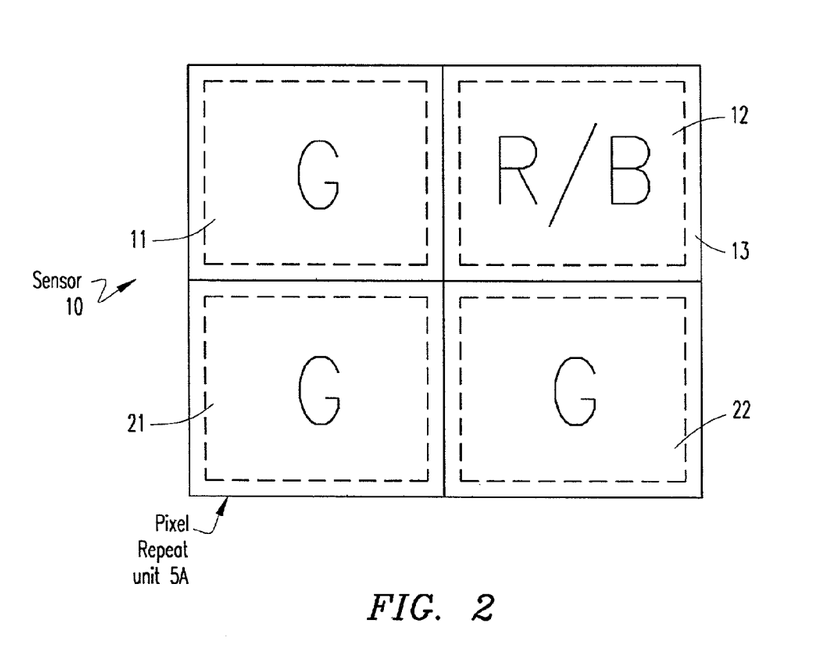
FIG. 2 illustrates an exemplary photo-detector repeat unit in accordance with embodiments of the present invention.

In order to extract four Y values, one Cx value and one Cy value for a group of photo-detectors, a two-color photo-detector capable of absorbing light in the red and blue wavelengths is included within each repeat unit of photo-detectors. The repeat unit is stepped and repeated throughout the array of photo-detectors. FIG. 2 illustrates an exemplary repeat unit 5A within an array of photo-detectors for a digital image sensor 10 having a two-color photo-detector (e.g., pixel) R/B in combination with three single-color photo-detectors (e.g., pixels) G, of the type described in commonly assigned U.S. patent application Ser. No. 10/043,810 (Attorney Docket Number 10010157-1), filed concurrently herewith and hereby incorporated by reference. In FIG. 2, within the area of four photo-detectors are five photo-detector elements (e.g., photodiodes, photo-conductors or photo-transistors). One of the photo-detectors is a two-color photo-detector R/B having two photo-detector elements 12 and 13, each detecting a different color, and the other three photo-detectors are single-color photo-detectors G each having a single photo-detector element, illustrated by reference numbers 11, 21 and 22, that detects a respective color that is different from the two colors detected by the two-color photo-detector R/B.

In the example shown in FIG. 2, the repeat unit 5A is fitted with a non-Bayer CFA, in which the two-color photo-detector R/B includes a magenta filter and the three single-color photo-detectors G include green filters. The magenta filter passes only the red and blue portions of the spectrum to the two photo-detector elements of the two-color photo-detector. The green filters absorb the blue and red portions of the spectrum, while passing the green portion of the spectrum to the single-color photo-detector elements 11, 21 and 22. However, it should be understood that other color filters (i.e., yellow) may be used depending on the color space and color sampling desired for the sensor.

A single layer of the appropriate thickness of amorphous silicon ($\alpha$Si:H) (illustrated by a dotted line) serves as an upper photo-detector element 12 of the two-color photo-detector R/B. The upper photo-detector element 12 absorbs the blue portion of the spectrum and passes the red portion of the spectrum to the lower photo-detector element 13 of the two-color photo-detector R/B. The lower photo-detector element 13 of the two-color photo-detector R/B resides in bulk silicon (illustrated by a solid line), which has a longer absorption length than the amorphous silicon. Therefore, the red portion of the spectrum is absorbed in the lower photo-detector element 13. As can be seen, the upper photo-detector element 12 of the two-color photo-detector R/B is in an elevated relation (i.e., above and spaced apart from) with the lower photo-detector element 13 of the two-color photo-detector R/B.

Advantageously, the amorphous silicon layer of the two-color photo-detector R/B provides independent control of both the upper 12 and lower 13 photo-detector elements. In addition, the use of amorphous silicon allows for a tunable color response, through the thickness of the amorphous silicon layer. For example, in other embodiments, the two-color photo-detector R/B may not include a color filter. Without a color filter, in order to tune the color response of the two-color photo-detector R/B, the thickness of the amorphous silicon layer of the upper photo-detector element 12 may be altered. For example, a thin amorphous silicon layer for the upper photo-detector element 12 would absorb only blue, while the bulk lower photo-detector element 13 below would absorb the compliment of blue (e.g., yellow). Alternatively, if the thickness of the amorphous silicon layer of the upper photo-detector element 12 is increased, the upper photo-detector element 12 would extract the compliment of red (e.g., cyan), while the bulk lower photo-detector element 13 below would absorb red.

Figure 3:
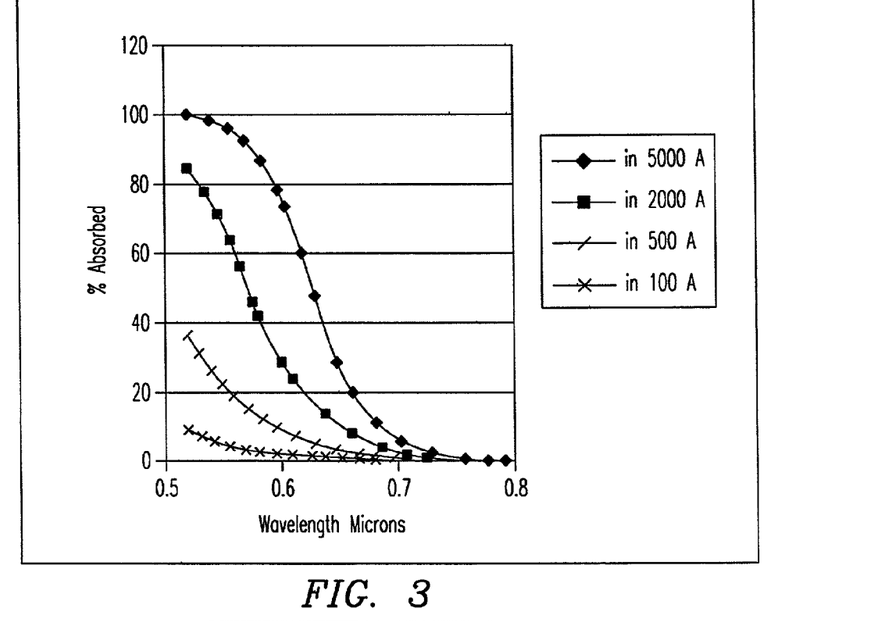
FIG. 3 is a chart of absorption percentage versus wavelength for varying thickness of amorphous silicon.

A chart of the absorption percentage versus wavelength for varying thickness of the amorphous silicon layer is shown in FIG. 3. As can be seen in FIG. 3, a 5000 Å thick layer of amorphous silicon absorbs 100 percent of the blue portion of the spectrum (near 0.5 microns wavelength), between 40 and 80 percent of the green (between approximately 0.55 and 0.65 microns wavelength) and less than 20 percent of the red portion of the spectrum (between approximately 0.65 and 0.75 microns wavelength).

Referring again to FIG. 2, each single-color photo-detector element is also made up of an elevated layer of amorphous silicon (illustrated by a dotted line). The thickness of the amorphous silicon layer of the single-color photo-detector elements may be chosen such that the amorphous silicon layer absorbs the green portion of the spectrum. However, it should be understood that the thickness of the amorphous silicon layer may be chosen to absorb yellow (if a yellow color filter is used) or white (if no color filter is used) to obtain a luminance value.

Figure 4:
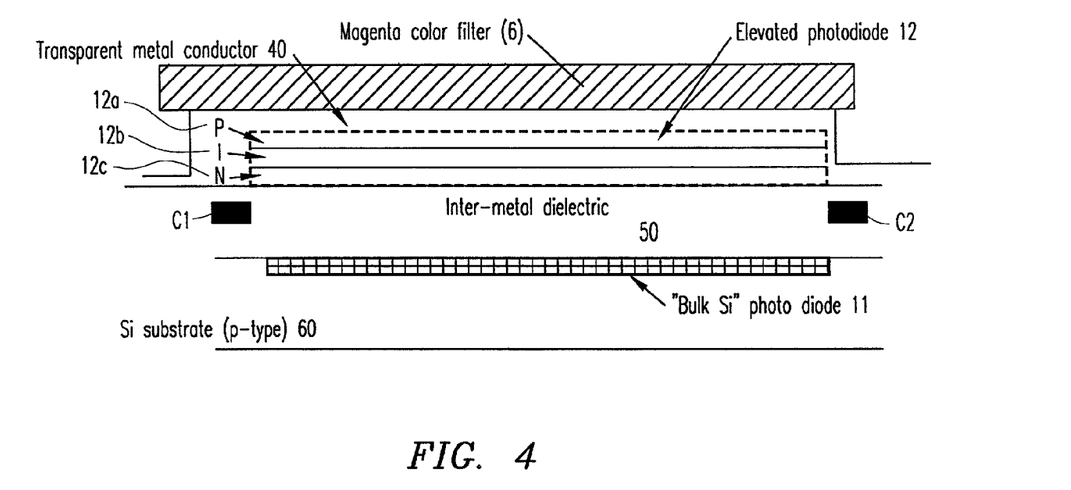
FIG. 4 is a cross-sectional view of a single-color photo-detector in accordance with embodiments of the present invention.

FIG. 4 is a cross-sectional view of an exemplary two-color photo-detector R/B of the type shown in FIG. 2, and described in commonly assigned U.S. patent application Ser. No. 10/086,125 (Attorney Docket Number 10010314-1), filed concurrently herewith and hereby incorporated by reference. A magenta color filter 6 resides above a transparent metal conductor 40, such as indium tin oxide. Below the transparent metal conductor 40 is an elevated photodiode 12 having a P-layer 12a, an I-layer 12b and an N-layer 12c. When reverse biased, the elevated photodiode 12 accumulates charge when it receives light.

A dielectric 50 (illustrated as an inter-metal dielectric), such as silicon dioxide ($SiO_2$), separates the elevated photodiode from the bulk silicon photodiode 13. The dielectric 50 separates the anodes of two photodiodes 12 and 13 in order to separate the current coming out of each of the two photodiodes 12 and 13. The bulk silicon photodiode 13 is formed in the silicon substrate 60. A shallow N+ region is formed in the P-type silicon substrate 60 to provide detection of light having wavelengths that are longer than the wavelength of light detected by the elevated photodiode 12.

Figure 5:
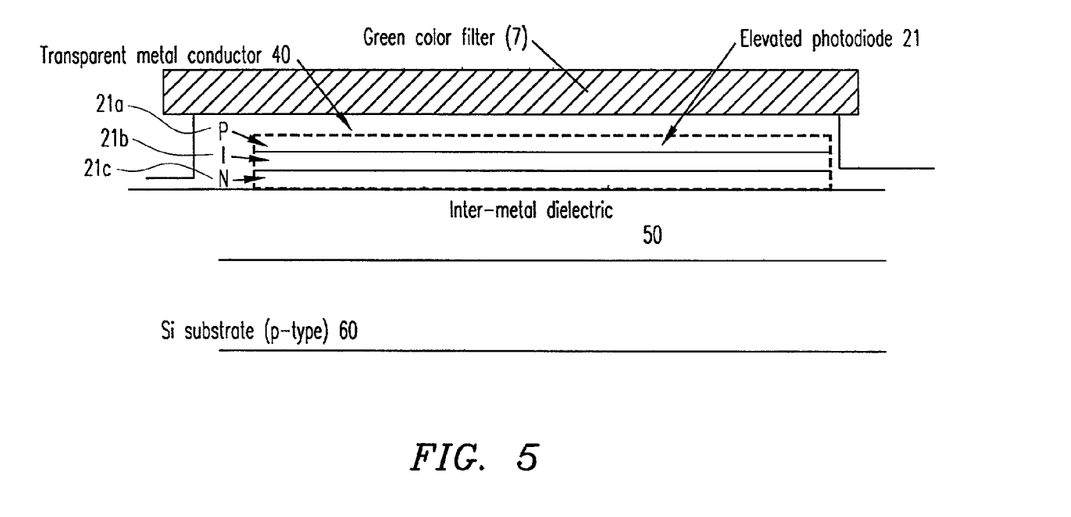
FIG. 5 is a cross-sectional view of a two-color photo-detector in accordance with embodiments of the present invention.

FIG. 5 is a cross-sectional view of an exemplary single-color photo-detector G of the type shown in FIG. 2. A green color filter 7 resides above a transparent metal conductor 40, such as indium tin oxide. Below the transparent metal conductor 40 is an elevated photodiode 21, which includes a P-layer 21a, an I-layer 21b and an N-layer 21c. An inter-metal dielectric 50, such as silicon dioxide ($SiO_2$) separates the elevated photodiode 21 from the silicon substrate 60.

Figure 6:
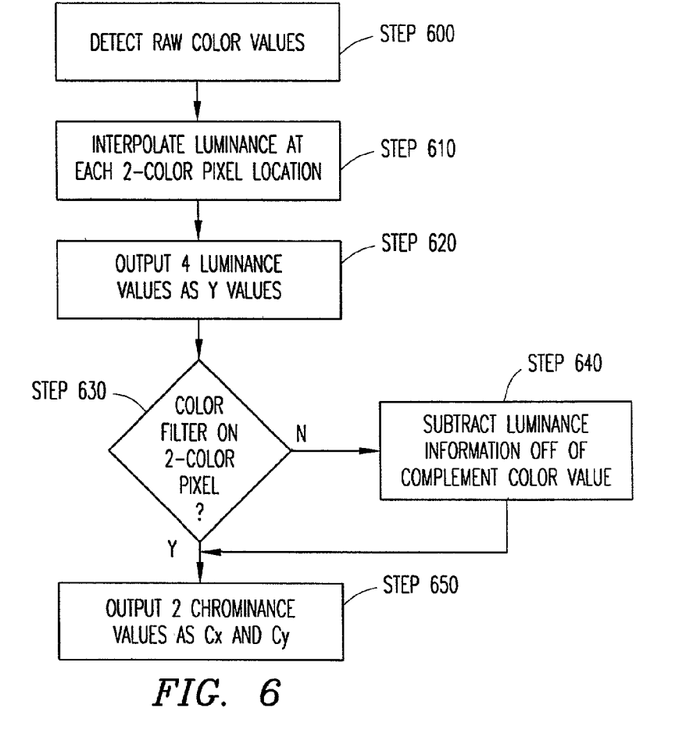
FIG. 6 is a flow chart illustrating exemplary pre-compression image processing steps for a sensor fitted with a color filter array as shown in FIG. 2.

FIG. 6 is a flowchart illustrating exemplary image processing steps for a sensor including a repeat unit as shown in FIG. 2. Initially, the raw color values detected by the array of photo-detectors are fed to the luminance interpolation logic shown in FIG. 1 (step 600). For each repeat unit of the type shown in FIG. 2, the raw color values include three green values, one blue value and one red value. The three green values are produced from the three single-color photo-detectors and the red and blue values are produced from the two-color photo-detector. The luminance interpolation logic interpolates a green value for the two-color photo-detector location based on the surrounding luminance values (step 610). For example, assume that the raw color data is received at the luminance interpolation logic as follows:

$$\begin{array}{ccc} G & G & G \\ G & R/B & G. \\ G & G & G \end{array}$$

To interpolate the green value at the R/B photo-detector location, the luminance interpolation logic can take the average of any combination of the surrounding green values. Once the green value is interpolated at each R/B photo-detector location, all of the green values are output as Y (luminance) values (step 620). It should be understood that edge-weighted interpolation, as well as any other type of interpolation scheme, may be used to interpolate the green values at the R/B photo-detector locations.

If the two-color photo-detector includes a magenta color filter M (step 630), no chrominance processing may need to be performed, and the blue value from the two-color photo-detector can be output as the Cx value for the repeat unit and the red value from the two-color photo-detector can be output as the Cy value for the repeat unit (step 650). However, if the two-color photo-detector does not include a magenta filter, the thickness of the amorphous silicon layer may be sufficient to absorb only blue, while the bulk silicon absorbs the complement of blue (e.g., green and red). Alternatively, the thickness of the amorphous silicon layer may be sufficient to absorb the complement of red (e.g., blue and green), while the bulk silicon absorbs only the red.

In either case, some green has been absorbed by the two-color photo-detector, which may need to be subtracted out from the Cx and Cy values (step 640). If blue and the complement of blue are detected by the two-color photo-detector, the interpolated green value for the two-color photo-detector location may need to be subtracted off of the complement of blue value before outputting (step 650) Cx (e.g., blue) and Cy (e.g., complement of blue minus green). Likewise, if red and the complement of red are detected by the two-color photo-detector, the interpolated green value for the two-color photo-detector location may need to be subtracted off of the complement of red value before outputting (step 650) Cx (e.g., complement of red minus green) and Cy (e.g., red). It should be noted that step 640 may not need to be performed, depending upon the digital image sensor application. Alternatively, step 640 may be performed in the final image processing, after de-compression of the image.

Figure 7:
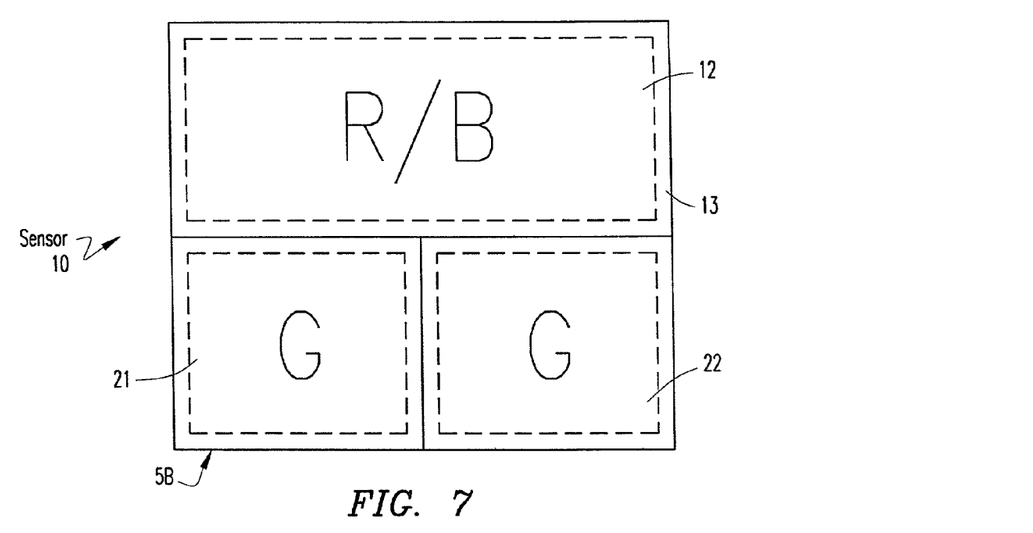
FIG. 7 illustrates another exemplary color filter array repeat unit in accordance with embodiments of the present invention.

FIG. 7 illustrates another exemplary repeat unit 5B within an array of photo-detectors of a digital image sensor 10 having one two-color photo-detector R/B in combination with two single-color photo-detectors G, in accordance with exemplary embodiments of the present invention. In FIG. 7 there are three photo-detectors and four photo-detector elements (i.e., photodiodes). One of the photo-detectors is a two-color photo-detector R/B having two photo-detector elements 12 and 13, each being capable of detecting a different color, and the other two photo-detectors are single-color photo-detectors G, each having a single photo-detector element 21 and 22, respectively, that detects a color that is different from the two colors detected by the two-color photo-detector R/B. The area of the two-color photo-detector R/B is shown equivalent to the area of both single-color photo-detectors G, for convenience. However, it should be noted that in other embodiments, the area of the two-color photo-detector R/B can be equivalent to the area of only one of the single-color photo-detectors G.

In the example shown in FIG. 7, the two-color photo-detector includes a magenta filter, so that only the red and blue portions of the spectrum are passed to the two photo-detector elements 12 and 13. However, it should be understood that other filters may be used depending on the color space and color sampling desired for the sensor. In addition, no color filter may be used, and the color response of the two-color photo-detector R/B may be tuned, as discussed above in connection with FIG. 2. As discussed above in connection with FIG. 2, the upper photo-detector element 12 is formed of a single layer of the appropriate thickness of amorphous silicon (αSi:H) (illustrated by a dotted line) in order to absorb the blue portion of the spectrum and pass the red portion of the spectrum to the lower photo-detector element 13 of the two-color photo-detector. The lower photo-detector element 13 of the two-color photo-detector resides in bulk silicon (illustrated by a solid line).

As in FIG. 2, green filters are used above the two single-color photo-detectors G of FIG. 7. Thus, the green filters absorb the blue and red portions of the spectrum, while passing the green portion of the spectrum to the green photo-detector elements 21 and 22. In addition, each green photo-detector element is also made up of an elevated layer of amorphous silicon (illustrated by a dotted line).

Figure 8:
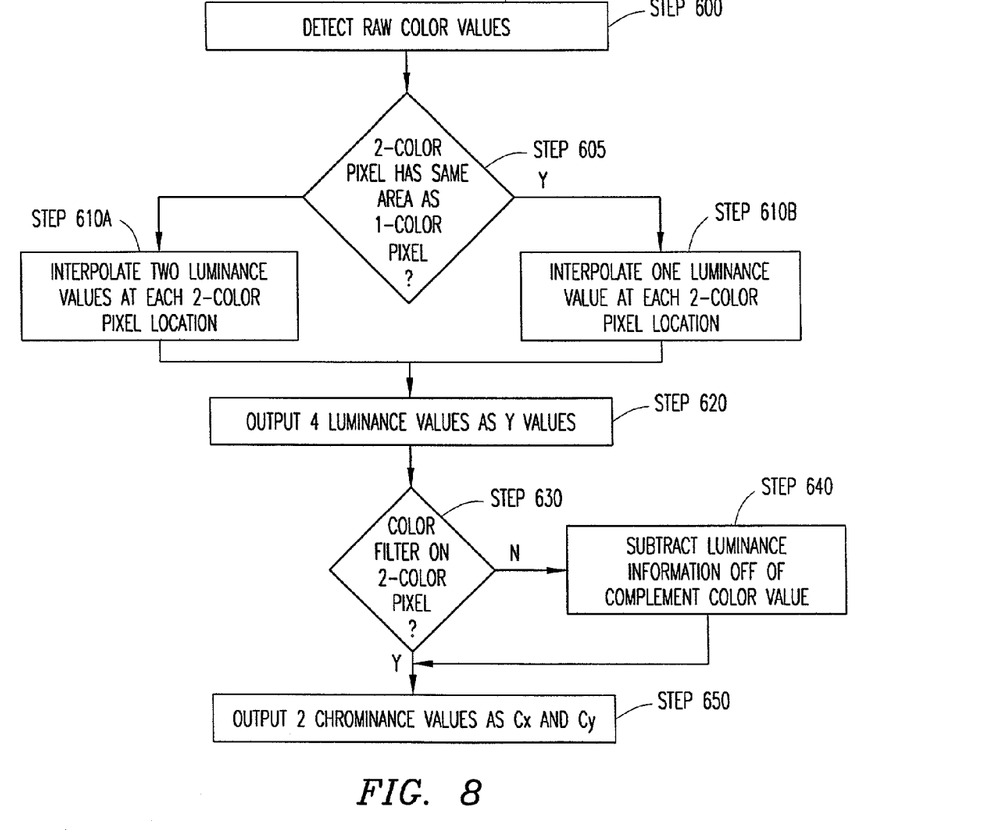
FIG. 8 is a flow chart illustrating exemplary steps for interpolating the luminance values and converting between color spaces for a sensor fitted with a color filter array as shown in FIG. 6.

FIG. 8 is a flowchart illustrating exemplary image processing steps for a sensor including a repeat unit as shown in FIG. 7. Initially, the raw color values detected by the array of photo-detectors are fed to the luminance interpolation logic shown in FIG. 1 (step 600). For each repeat unit of the type shown in FIG. 7, the raw color values include two green values, one blue value and one red value. The two green values are produced from the two single-color photo-detectors and the red and blue values are produced from the two-color photo-detector. The luminance interpolation logic interpolates either one or two green values for the two-color photo-detector location based on the surrounding luminance values. For example, assume that the raw color data is received at the luminance interpolation logic as follows:

G   G   G   G
R/B R/B .
G   G   G   G

Since each R/B photo-detector location has the same area as two G photo-detector locations (step 605), the interpolation logic must interpolate two green values for each R/B photo-detector location (step 610A). To interpolate the two green values at each R/B photo-detector location, the luminance interpolation logic can take the average of any combination of the surrounding green values. As another example, if the R/B photo-detector location has the same area as one of the G photo-detector locations (step 605), the raw color data received at the luminance interpolation logic may be similar to the following:

G   R/B G   G
R/B G   G   R/B .
G   G   R/B G

To interpolate one missing green value at each R/B photo-detector location (step 610B), the luminance interpolation logic can take the average of any combination of the surrounding green photo-detectors. Once the green value is interpolated at each R/B photo-detector location, all of the green values are output as Y (luminance) values (step 620). It should be understood that edge-weighted interpolation, as well as any other type of interpolation scheme, may be used to interpolate the green values at the R/B photo-detector locations.

It should further be understood that in order to output four Y values from a sensor having a three-photo-detector repeat unit, as above, one Y value must be "borrowed" from a neighboring repeat unit. Alternatively, the array of photo-detectors can be divided into blocks of four, so that four Y values are retrieved from every block of four. However, there may be certain blocks of four that have two R/B photo-detector locations, requiring that an average of the red and blue values at the two R/B photo-detector locations be taken as the Cx and Cy values.

If the two-color photo-detector includes a magenta color filter M (step 630), no chrominance processing may need to be performed, and the blue value from the two-color photo-detector can be output as the Cx value for the repeat unit and the red value from the two-color photo-detector can be output as the Cy value for the repeat unit (step 650). However, if the two-color photo-detector does not include a magenta filter (step 630), the thickness of the amorphous silicon layer may be sufficient to absorb only blue, while the bulk silicon absorbs the complement of blue (e.g., green and red). Alternatively, the thickness of the amorphous silicon layer may be sufficient to absorb the complement of red (e.g., blue and green), while the bulk silicon absorbs only the red.

In either case, some green has been absorbed by the two-color photo-detector, which may need be subtracted out from the Cx and Cy values (step 640). In addition, if blue and the complement of blue are detected by the two-color photo-detector, the interpolated green value for the two-color photo-detector location may need to be subtracted off of the complement of blue value before outputting (step 650) Cx (e.g., blue) and Cy (e.g., complement of blue minus green). Likewise, if red and the complement of red are detected by the two-color photo-detector, the interpolated green value for the two-color photo-detector location may need to be subtracted off of the complement of red value before outputting (step 650) Cx (e.g., complement of red minus green) and Cy (e.g., red). As discussed above in connection with FIG. 6, step 640 is optional.

Figure 9:
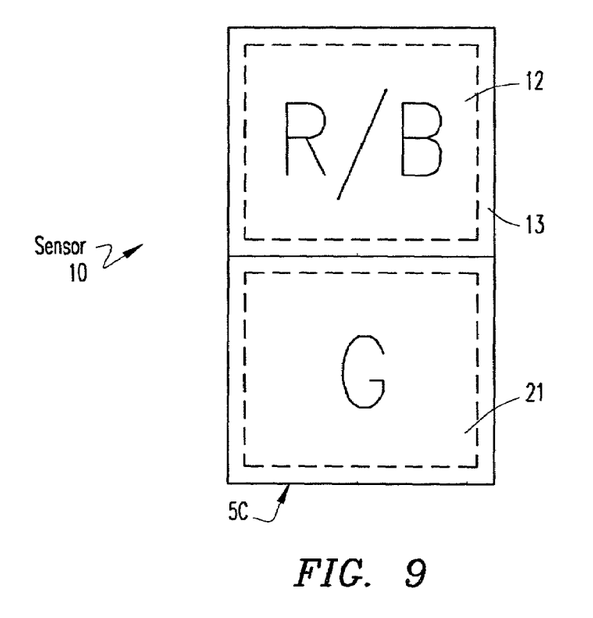
FIG. 9 illustrates another exemplary color filter array repeat unit in accordance with embodiments of the present invention.

FIG. 9 illustrates another exemplary repeat unit 5C of a digital image sensor 10 having one two-color photo-detector R/B in combination with one single-color photo-detector G, in accordance with exemplary embodiments of the present invention. In FIG. 9 there are two photo-detectors and three photo-detector elements (i.e., photodiodes). One of the photo-detectors is a two-color photo-detector R/B having two photo-detector elements 12 and 13, each being capable of detecting a different color, and the other photo-detector is a single-color photo-detector G having a single photo-detector element 21 that detects a color that is different from the two colors detected by the two-color photo-detector R/B.

In the example shown in FIG. 9, the two-color photo-detector includes a magenta filter, so that only the red and blue portions of the spectrum are passed to the two photo-detector elements 12 and 13. However, it should be understood that other filters may be used depending on the color space and color sampling desired for the sensor. In addition, no color filter may be used, and the color response of the two-color photo-detector R/B may be tuned, as discussed above in connection with FIG. 2. As further discussed above in connection with FIG. 2, the upper photo-detector element 12 is formed of a single layer of the appropriate thickness of amorphous silicon ($\alpha$Si:H) (illustrated by a dotted line) in order to absorb the blue portion of the spectrum and pass the red portion of the spectrum to the lower photo-detector element 13 of the two-color photo-detector. The lower photo-detector element 13 of the two-color photo-detector resides in bulk silicon (illustrated by a solid line).

As in FIG. 2, a green filter is used above the single-color photo-detector G of FIG. 9 to absorb the blue and red portions of the spectrum, while passing the green portion of the spectrum to the green photo-detector element 21. In addition, the green photo-detector element is also made up of an elevated layer of amorphous silicon (illustrated by a dotted line).

Figure 10:
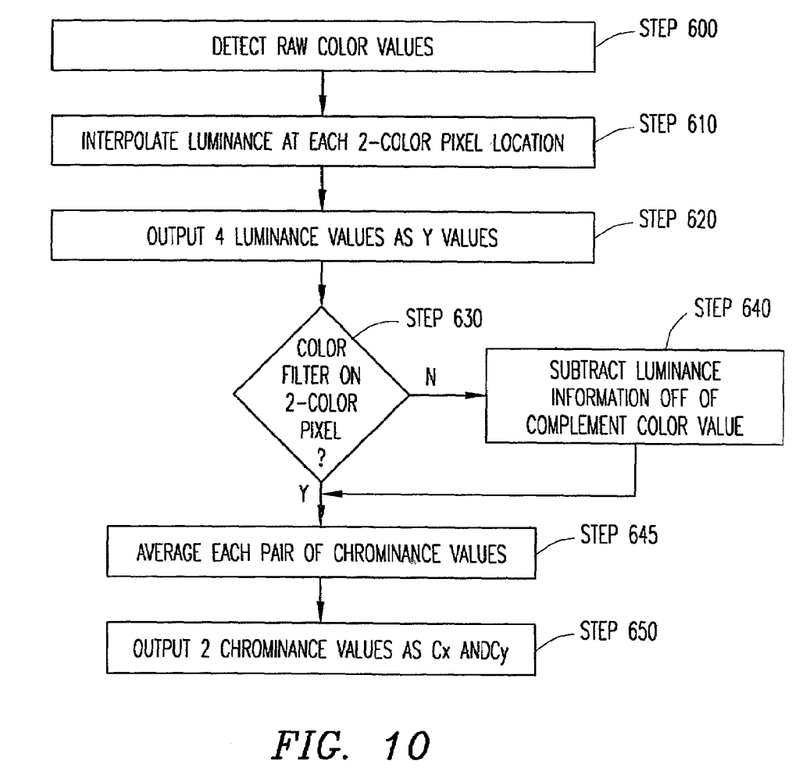
FIG. 10 is a flow chart for interpolating the luminance values and converting between color spaces for a sensor fitted with a color filter array as shown in FIG. 8.

FIG. 10 is a flowchart illustrating exemplary image processing steps for a sensor including a repeat unit as shown in FIG. 9. Initially, the raw color values detected by the array of photo-detectors are fed to the luminance interpolation logic shown in FIG. 1 (step 600). For each repeat unit of the type shown in FIG. 9, the raw color values include one green value, one blue value and one red value. The green value is produced from the single-color photo-detector and the red and blue values are produced from the two-color photo-detector. The luminance interpolation logic interpolates a green value for the two-color photo-detector location based on the surrounding luminance values (step 610). For example, assume that the raw color data is received at the luminance interpolation logic as follows:

$$\begin{array}{cccc} G & G & G & G \\ R/B & R/B & R/B & R/B \\ G & G & G & G \end{array}$$

To interpolate the missing green value at each R/B photo-detector location, the luminance interpolation logic can take the average of any combination of the surrounding green photo-detectors. Once the green value is interpolated at each R/B photo-detector location, all of the green values are output as Y (luminance) values (step 620).

Since the repeat unit includes only two photo-detectors, to output four Y values, one Cx and one Cy value, two adjacent repeat units can be combined in order to sub-sample by four. However, it should be understood that other sub-sampling factors (e.g., 2, 8, 16, etc.) can be used. If two adjacent repeat units are combined, and the two adjacent two-color photo-detectors do not include magenta filters (step 630), as described above in connection with FIGS. 6 and 8, depending on the thickness of the amorphous silicon layer, the two-color photo-detector may absorb blue and the complement of blue or red and the complement of red. In either case, some green has been absorbed by the two-color photo-detector, which may need to be subtracted out from the complement values (step 640). As discussed above in connection with FIG. 6, step 640 is optional.

It should be understood that both two-color photo-detectors should have substantially the same thickness of amorphous silicon, and therefore, both absorb blue and the complement of blue or red and the complement of red. Once the green has been subtracted off of the complement values (step 640), or if the two-color photo-detectors do include magenta filters (step 630), the values from the two adjacent two-color photo-detectors can be averaged (step 645), resulting in one Cx value and one Cy value output for the two repeat units (step 650).

It should be understood that the above discussed image processing techniques apply to any repeat unit within an array of photo-detectors. For example, in a repeat unit including seven single-color photo-detectors and one two-color photo-detector, the luminance value at the two-color photo-detector location would be interpolated using the average of any combination of the surrounding luminance values, and to obtain four luminance values in combination with two chrominance values for compression purposes, the repeat unit would be divided in half, with the chrominance values from the two-color photo-detector applying to both parts of the repeat unit.

It should further be understood that additional image processing steps may be applied, depending on the sensor application and area constraints. For example, in order to convert the raw data to a color plane closer to the YCbCr color plane, multiplication factors for the Y, Cr and Cb values can be hard-wired into the sensor without including multipliers. As discussed above, to convert between RGB color space and YCbCr color space, a matrix can be applied to the raw RGB values. The multiplication factors in the conversion matrix can be hard-wired into the sensor, so that the raw color values are simply shifted by a number of bits corresponding to the associated multiplication factors, and added to or subtracted from the other similarly shifted color values to obtain the Y, Cr and Cb color space values.

It should further be understood that other color spaces, such as Lab (or L*a*b*), may be used instead of the YCbCr described herein. Additional processing, such as hard-wiring multiplication factors, can easily convert the raw RGB color values to any other color space. In addition, it should be noted that for any color space, the colors can be sub-sampled in any manner (e.g., 4:1:1, 2:1:1, 8:1:1, etc.).

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

We claim:

1. A digital image system, comprising:
    a digital image sensor including at least an array of photo-detectors having one or more repeat units therein, each said repeat unit including at least one single-color photo-detector capable of detecting a luminance value and a two-color photo-detector capable of detecting first and second chrominance values; and interpolation logic connected to receive said detected luminance value and interpolate at least one interpolated luminance value associated with said two-color photo-detector, said interpolation logic being further connected to output said detected luminance value without interpolating said first or second chrominance value associated with said detected luminance value.

2. The system of claim 1, wherein said luminance value is associated with the intensity of light within a first range of wavelengths, said first chrominance value is associated with the intensity of light within a second range of wavelengths and said third chrominance value is associated with the intensity of light within a third range of wavelengths.

3. The system of claim 2, further comprising:
output logic connected to receive said detected luminance value, said detected first and second chrominance values and said interpolated luminance value and output at least one group of color values including four output luminance values, one first output chrominance value and one second output chrominance value, at least one of said four output luminance values being derived from said detected luminance value or said interpolated luminance value, said first output chrominance value being derived from said first chrominance value and said second output chrominance value being derived from said second chrominance value.

4. The system of claim 3, wherein said interpolation logic and said output logic are included within said digital image sensor.

5. The system of claim 3, wherein said four output luminance values, said first output chrominance value and said second output chrominance value are directly compressed with no additional processing.

6. The system of claim 3, further comprising:
chrominance processing logic connected to receive said detected first and second chrominance values and produce said first output chrominance value and said second output chrominance value.

7. The system of claim 6, wherein said chrominance processing logic is capable of subtracting said interpolated luminance value from said first chrominance value to produce said first output chrominance value.

8. The system of claim 6, wherein said chrominance processing logic is further connected to receive additional detected first and second chrominance values, said chrominance processing logic averaging said detected first chrominance value and said additional detected first chrominance value to produce said first output chrominance value and averaging said detected second chrominance value with said additional detected second chrominance value to produce said second output chrominance value.

9. The system of claim 3, wherein said single-color photo-detector for said repeat unit comprises a first single-color photo-detector capable of detecting a first luminance value and a second single-color photo-detector capable of detecting a second luminance value.

10. The system of claim 9, wherein said at least one interpolated luminance value comprises a single interpolated luminance value associated with said two-color photo-detector.

11. The system of claim 9, wherein said at least one interpolated luminance value comprises first and second interpolated luminance values associated with said two-color photo-detector.

12. The system of claim 11, wherein said four output luminance values are derived from said first and second interpolated luminance values and said first and second detected luminance values.

13. The system of claim 3, wherein said single-color photo-detector for said repeat unit comprises a first single-color photo-detector capable of detecting a first luminance value, a second single-color photo-detector capable of detecting a second luminance value and a third single-color photo-detector capable of detecting a third luminance value.

14. The system of claim 13, wherein said four output luminance values are derived from said first, second and third detected luminance values and said interpolated luminance value.

15. A digital image system, comprising:
a digital image sensor including at least an array of photo-detectors having one or more repeat units therein, each said repeat unit including at least one single-color photo-detector capable of detecting a luminance value and a two-color photo-detector capable of detecting first and second chrominance values; and
interpolation logic connected to receive said detected luminance value and interpolate at least one interpolated luminance value associated with said two-color photo-detector, said interpolation logic being further connected to assign said first and second chrominance values to said detected luminance value and output said detected luminance value and said first and second chrominance values.

16. The system of claim 15, wherein said luminance value is associated with the intensity of light within a first range of wavelengths, said first chrominance value is associated with the intensity of light within a second range of wavelengths and said third chrominance value is associated with the intensity of light within a third range of wavelengths.

17. The system of claim 16, further comprising:
output logic connected to receive said detected luminance value, said detected first and second different chrominance values and said interpolated luminance value and output at least one group of color values including four output luminance values, one first output chrominance value and one second output chrominance value, at least one of said four output luminance values being derived from said detected luminance value or said interpolated luminance value, said first output chrominance value being derived from said first chrominance value and said second output chrominance value being derived from said second chrominance value.

18. The system of claim 17, wherein said interpolation logic and said output logic are included within said digital image sensor.

19. The system of claim 17, wherein said four output luminance values, said first output chrominance value and said second output chrominance value are directly compressed with no additional processing.

20. The system of claim 17, further comprising:
chrominance processing logic connected to receive said detected first and second chrominance values and produce said first output chrominance value and said second output chrominance value.

21. The system of claim 20, wherein said chrominance processing logic is capable of subtracting said interpolated luminance value from said first chrominance value to produce said first output chrominance value.

22. The system of claim 20, wherein said chrominance processing logic is further connected to receive additional detected first and second chrominance values, said chrominance processing logic averaging said detected first chrominance value and said additional detected first chrominance value to produce said first output chrominance value and averaging said detected second chrominance value with said additional detected second chrominance value to produce said second output chrominance value.

23. A method for processing raw digital color image values, comprising:
providing an array of photo-detectors on a digital image sensor, said array of photo-detectors having one or more repeat units therein, each said repeat unit including at least one single-color photo-detector capable of detecting a luminance value and a two-color photo-detector capable of detecting first and second chrominance values;
interpolating at least one interpolated luminance value associated with said two-color photo-detector; and
processing said detected luminance value without interpolating said first or second chrominance value associated with said detected luminance value.

24. The method of claim 23, further comprising:
outputting at least one group of color values including four output luminance values, one first output chrominance value and one second output chrominance value, at least one of said four output luminance values being derived from said detected luminance value or said interpolated luminance value, said first output chrominance value being derived from said first chrominance value and said second output chrominance value being derived from said second chrominance value.

25. The method of claim 24, further comprising:
compressing said four output luminance values, said first output chrominance value and said second output chrominance value directly with no additional processing.

26. The method of claim 24, further comprising:
subtracting said interpolated luminance value from said detected first chrominance value to produce said first output chrominance value.

27. The method of claim 23, further comprising:
detecting additional first and second chrominance values;
averaging said detected first chrominance value and said detected additional first chrominance value to produce said first output chrominance value; and
averaging said detected second chrominance value with said detected additional second chrominance value to produce said second output chrominance value.

* * * * *